US012674673B2

(12) United States Patent
Kickton et al.

(10) Patent No.: US 12,674,673 B2
(45) Date of Patent: Jul. 7, 2026

(54) NAVIGATION MAP FOR AN AT LEAST PARTIALLY AUTOMATED MOBILE PLATFORM

(71) Applicants: MERCEDES-BENZ GROUP AG, Stuttgart (DE); ROBERT BOSCH GMBH, Stuttgart-Feuerbach (DE)

(72) Inventors: Anne Kickton, Santa Clara, CA (US); Andreas Heyl, Renningen (DE)

(73) Assignees: ROBERT BOSCH GMBH, Stuttgart (DE); MERCEDES-BENZ GROUP AG, Stuttgart-Feuerbach (DE)

( * ) Notice: Subject to any disclaimer, the term of this patent is extended or adjusted under 35 U.S.C. 154(b) by 437 days.

(21) Appl. No.: 18/016,523

(22) PCT Filed: Jul. 16, 2021

(86) PCT No.: PCT/EP2021/069971
§ 371 (c)(1),
(2) Date: Jan. 17, 2023

(87) PCT Pub. No.: WO2022/013426
PCT Pub. Date: Jan. 20, 2022

(65) Prior Publication Data
US 2023/0273032 A1     Aug. 31, 2023

(30) Foreign Application Priority Data

Jul. 16, 2020    (DE) ..................... 10 2020 208 946.9

(51) Int. Cl.
G01C 21/00 (2006.01)
B60W 50/14 (2020.01)
(Continued)

(52) U.S. Cl.
CPC ......... G01C 21/3461 (2013.01); B60W 50/14 (2013.01); B60W 60/0016 (2020.02); B60W 2050/143 (2013.01); B60W 2520/00 (2013.01)

(58) Field of Classification Search
CPC ............ G01C 21/3461; G01C 21/3826; G01C 21/3415; B60W 50/14; B60W 60/0016; B60W 2050/143; B60W 2520/00
See application file for complete search history.

(56) References Cited

U.S. PATENT DOCUMENTS 10,015,452 B1 *   7/2018   Schofield ................. B60Q 1/08
10,474,164 B2    11/2019   Wheeler
(Continued)

FOREIGN PATENT DOCUMENTS

DE        102004047130 B4    4/2006
EP              3379201 A1    9/2018

OTHER PUBLICATIONS

Japanese Office Action mailed on Jan. 16, 2024 for Japanese Patent Application No. 2023-502766 with English translation.
(Continued)

*Primary Examiner* — Ian Jen
(74) *Attorney, Agent, or Firm* — HUNTON ANDREWS KURTH LLP

(57) ABSTRACT

A navigation map for an at least partially automated mobile platform (130) is proposed, comprising:
Descriptions of courses of a plurality of lanes (120), each lane (120) of the plurality of lanes having a plurality of lane segments (150); and
Off-road environment data (140) of the plurality of lanes (120), wherein the off-road environment data is assigned to respective lane segments (150) of the respective lane (120), and wherein the off-road envi-
(Continued)

ronment data includes an emergency drivability rating for an off-road environment (140) of the respective lane segment (150).

12 Claims, 3 Drawing Sheets

(51) Int. Cl.
  *B60W 60/00*          (2020.01)
  *G01C 21/34*          (2006.01)

(56)                References Cited

U.S. PATENT DOCUMENTS

| | | | | |
|---|---|---|---|---|
| 11,566,903 B2 * | 1/2023 | Colgate | ............. | G01C 21/3841 |
| 11,566,904 B2 * | 1/2023 | Fasola | ................... | G01S 7/4808 |
| 11,662,461 B2 * | 5/2023 | Lilja | .................... | G06V 20/588 |
| | | | | 701/1 |
| 11,763,576 B2 * | 9/2023 | Lilja | ..................... | G06V 10/80 |
| | | | | 701/117 |
| 12,128,885 B2 * | 10/2024 | Carlander | .............. | G06V 20/58 |
| 2005/0038595 A1 * | 2/2005 | Yokota | ................... | G01C 21/26 |
| | | | | 701/454 |
| 2008/0319646 A1 * | 12/2008 | Hopkins | ................ | G01C 21/26 |
| | | | | 701/533 |
| 2009/0140887 A1 * | 6/2009 | Breed | ................ | G01C 21/1656 |
| | | | | 701/116 |
| 2014/0114502 A1 * | 4/2014 | Hugron | .............. | B60W 30/146 |
| | | | | 701/1 |
| 2014/0244110 A1 * | 8/2014 | Tharaldson | ............ | G01C 21/20 |
| | | | | 701/99 |
| 2015/0332114 A1 * | 11/2015 | Springer | ............... | B60W 50/14 |
| | | | | 348/148 |
| 2016/0003621 A1 * | 1/2016 | Koenig | ................... | B60K 35/28 |
| 2018/0188742 A1 * | 7/2018 | Wheeler | ................... | G08G 1/04 |
| 2018/0252539 A1 * | 9/2018 | Yunoki | .................. | G01C 21/34 |
| 2019/0234740 A1 * | 8/2019 | Gabbay | .............. | G01C 21/3415 |
| 2019/0265064 A1 * | 8/2019 | Koenig | ................... | B60K 35/22 |
| 2019/0301872 A1 * | 10/2019 | Jin | ......................... | G06V 20/584 |
| 2019/0318173 A1 * | 10/2019 | Kristensen | ...... | B60W 30/18009 |
| 2020/0200547 A1 * | 6/2020 | Miller | ............... | G01C 21/3874 |
| 2021/0107566 A1 * | 4/2021 | Seegmiller | ......... | G01C 21/3492 |
| 2021/0269056 A1 * | 9/2021 | Zhu | ...................... | G05D 1/0212 |
| 2021/0372803 A1 * | 12/2021 | van der Vlist | ..... | G01C 21/3461 |
| 2022/0274624 A1 * | 9/2022 | Wray | ................. | G01C 21/3837 |
| 2022/0306152 A1 * | 9/2022 | Zhang | ............. | B60W 60/0017 |
| 2022/0412747 A1 * | 12/2022 | Miller | ................. | G05D 1/0088 |

OTHER PUBLICATIONS

International Search Report and Written Opinion mailed on Nov. 18, 2021 for International Patent Application No. PCT/EP2021/069971 (with English Translations).

Korean Office Action mailed on Jul. 21, 2025 for Korean Patent Application No. 10-2023-7005446 with English translation.

CN Patent office, Office action issued to CN App. No. 2021800663099 dated Jan. 27, 2026, 9 pages, with English translation.

CN Patent office, Second Office action issued to CN App. No. 2021800605483 dated Apr. 23, 2026, 22 pages, with English translation.

* cited by examiner

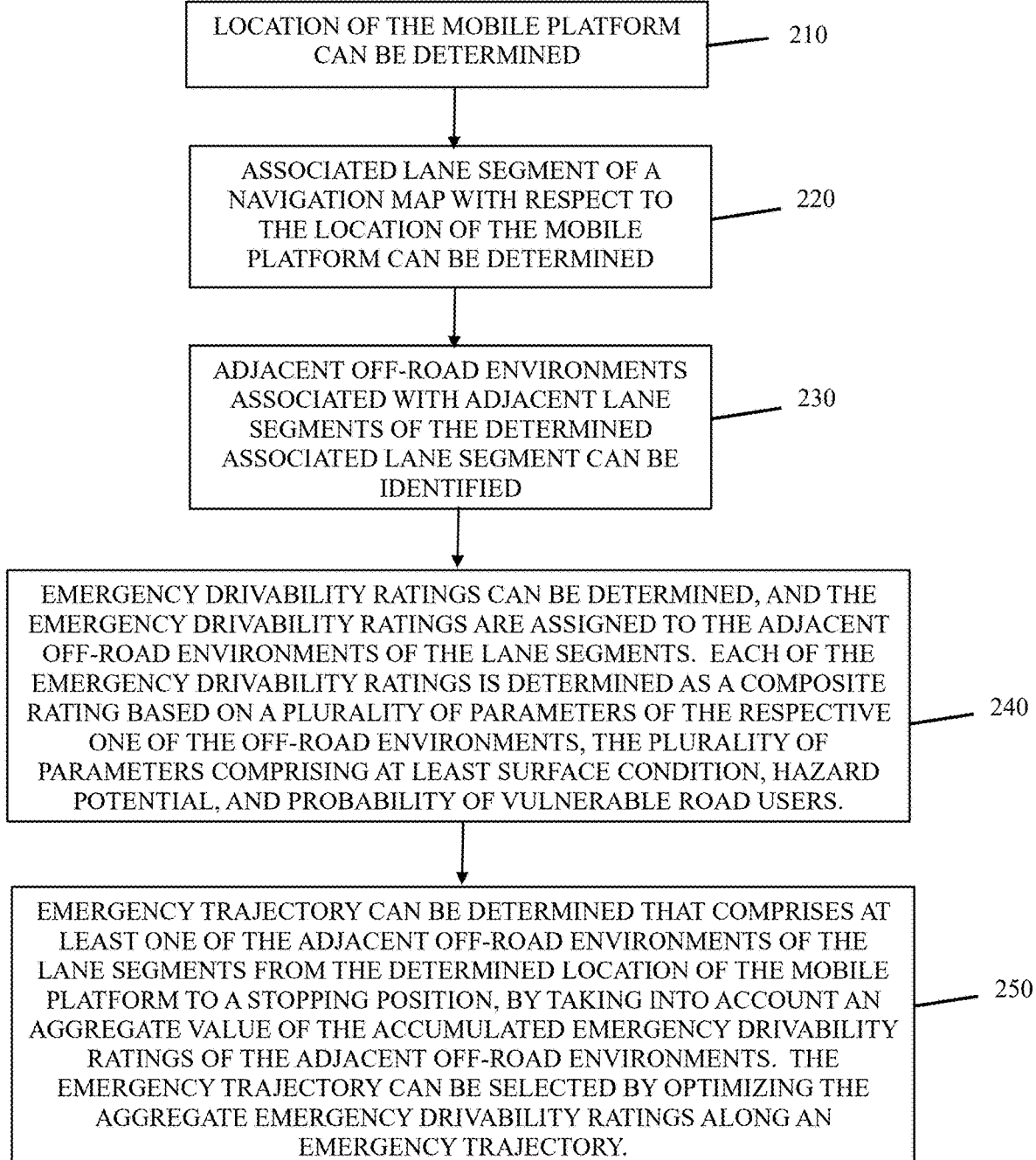

LOCATION OF THE MOBILE PLATFORM CAN BE DETERMINED — 210

ASSOCIATED LANE SEGMENT OF A NAVIGATION MAP WITH RESPECT TO THE LOCATION OF THE MOBILE PLATFORM CAN BE DETERMINED — 220

ADJACENT OFF-ROAD ENVIRONMENTS ASSOCIATED WITH ADJACENT LANE SEGMENTS OF THE DETERMINED ASSOCIATED LANE SEGMENT CAN BE IDENTIFIED — 230

EMERGENCY DRIVABILITY RATINGS CAN BE DETERMINED, AND THE EMERGENCY DRIVABILITY RATINGS ARE ASSIGNED TO THE ADJACENT OFF-ROAD ENVIRONMENTS OF THE LANE SEGMENTS. EACH OF THE EMERGENCY DRIVABILITY RATINGS IS DETERMINED AS A COMPOSITE RATING BASED ON A PLURALITY OF PARAMETERS OF THE RESPECTIVE ONE OF THE OFF-ROAD ENVIRONMENTS, THE PLURALITY OF PARAMETERS COMPRISING AT LEAST SURFACE CONDITION, HAZARD POTENTIAL, AND PROBABILITY OF VULNERABLE ROAD USERS. — 240

EMERGENCY TRAJECTORY CAN BE DETERMINED THAT COMPRISES AT LEAST ONE OF THE ADJACENT OFF-ROAD ENVIRONMENTS OF THE LANE SEGMENTS FROM THE DETERMINED LOCATION OF THE MOBILE PLATFORM TO A STOPPING POSITION, BY TAKING INTO ACCOUNT AN AGGREGATE VALUE OF THE ACCUMULATED EMERGENCY DRIVABILITY RATINGS OF THE ADJACENT OFF-ROAD ENVIRONMENTS. THE EMERGENCY TRAJECTORY CAN BE SELECTED BY OPTIMIZING THE AGGREGATE EMERGENCY DRIVABILITY RATINGS ALONG AN EMERGENCY TRAJECTORY. — 250

Fig. 2

NAVIGATION MAP FOR AN AT LEAST PARTIALLY AUTOMATED MOBILE PLATFORM

CROSS REFERENCE TO RELATED APPLICATION(S)

This application relates to, and claims the benefit and priority from International Patent Application No. PCT/EP2021/069971 filed on Jul. 16, 2021 that published as International Patent Publication No. WO 2022/013426 on Jan. 20, 2022, which claims the benefit and priority from German Patent Application No. 10 2020 208 946.9 which was filed on Jul. 16, 2020, the entire disclosures of which are incorporated herein by reference.

STATE OF THE ART

High-resolution (HD) maps are being developed for automated driving mobile platforms (ADS: Automated Driving Systems) that provide information about roads, lanes, lane boundaries, zones, etc.

In the standard on automated driving (SAE J3016), conditions for minimal risk are defined as: "A state to which a user or an ADS should bring a vehicle after performing a fallback of the dynamic driving task (DDT) to reduce the risk of an accident when a particular route cannot or should not be completed." further: "It may mean automatically bringing the vehicle to a stop in its current path of travel, or it may require a more comprehensive maneuver aimed at removing the vehicle from an active lane and/or automatically returning the vehicle to a dispatch facility."

Actual automatic driving systems (ADS) typically not only compute trajectories for normal operation, but also compute "fallback trajectories" in parallel, which are executed only when a system error occurs that makes it impossible to continue a safe "normal trajectory".

DISCLOSURE OF THE INVENTION

The calculation of these "fallback trajectories" is also mainly based on the combination of ambient perception and map data. In particular, for trajectories that terminate off-road, this implies an additional perceptual effort to observe and classify the roadside area. According to aspects of the invention, a navigation map for an at least partially automated mobile platform, a method for determining an emergency trajectory, a method for selecting a route, a method for actuation, a device, a computer program, and a machine-readable storage medium according to the features of the independent claims are proposed, which solve the above tasks at least in part. Advantageous embodiments are subject of the dependent claims as well as the following specification.

In this entire specification of the invention, the sequence of method steps is presented in such a way that the method can be easily understood. However, the person skilled in the art will recognize that many of the process steps can also be performed in a different sequence and lead to the same or a corresponding result. In this sense, the sequence of the process steps can be changed accordingly.

According to an aspect, a navigation map for an at least partially automated mobile platform is proposed comprising a description of courses of a plurality of lanes, wherein the respective lane of the plurality of lanes comprises a plurality of lane segments. Further, the navigation map has off-road environment data of the plurality of lanes, wherein the off-road environment data is associated with the respective lane segments of the respective lane, and wherein the off-road environment data has an emergency drivability rating for an off-road environment of the respective lane segment.

According to an aspect, a navigation map for an at least partially automated mobile platform is proposed comprising a description of courses of a plurality of lanes, wherein the respective lane of the plurality of lanes comprises a plurality of lane segments. Further, the navigation map has off-road environment data of the plurality of lanes, wherein the off-road environment data is associated with the respective lane segments of the respective lane, and wherein the off-road environment data has an emergency drivability rating for an off-road environment of the respective lane segment.

Advantageously, the association of the off-road environment with a respective lane segment can reduce the amount of navigation map data required, since the off-road environment that may be required is characterized or classified by the emergency drivability rating in addition to a lane with respect to a relevant characterization, in particular for a determination of an emergency trajectory. This eliminates the need for a detailed description of the off-road environment adjacent to a roadway. Furthermore, the environment perception of the mobile platform is relieved from determining online objects of the off-road environment that are not relevant for normal operation. Furthermore, such a navigation map can have a lower level of detail of the environment next to the road, since the essential information about the off-road environment is summarized abstractly by the emergency drivability rating.

In addition, the association of emergency drivability ratings to the respective off-road environments of the lane segments provides a redundant description for the environment perception, since an integrity of an environment perception can be checked or improved accordingly for a determination of an emergency trajectory.

Furthermore, in case of a partial or complete failure of the environment perception of the mobile platform, a safety information for an emergency trajectory is provided, which can be used for trajectory planning.

Further advantageously, an at least partially automated mobile platform system (ADS) can, under certain conditions, e.g., when the automated driving system anticipates that preceding environmental or traffic conditions or sensor degradation will reduce the ability of its perception below a safe value, check whether it is safe to drive on a certain lane segment, or zone, such as a bridge, so that it can, at a certain distance in the direction of travel, move the mobile platform onto a shoulder of the corresponding lane segment of a road.

In addition, such a navigation map can be used to increase an avoidance driving range, because this data can be used to calculate safe avoidance routes further away on the road, even if lane segments are involved that are beyond the perception range of the mobile platform's environment perception system, or if the mobile platform's environment perception system has defective or limited perception.

An environment perception of the mobile platform can use the emergency drivability ratings associated with the respective lane segments for the off-road environment as a prior to improve or secure the environment perception.

The off-road environment information is most reliable for environments where changes in parameters from which emergency drivability ratings are determined are unlikely or less frequent, e.g., environments adjacent to a highway where the occurrence or presence of traffic users at risk of injury (VRUs) is unlikely. In addition, information about the off-road environment is important for roadway segments that are located between nodes (hubs) for automated platforms.

According to one aspect, it is proposed that the navigation map is a high-resolution digital navigation map.

According to an aspect, it is proposed that the respective off-road environment data comprises a plurality of parameters for describing the off-road environment and a drivability rating is assigned to the respective parameter.

According to an aspect, it is proposed that the plurality of parameters describe an extent and/or an accessibility and/or a hazard potential of the off-road environment.

According to an aspect, it is proposed that the plurality of parameters comprises one or more of the following:

Traversability to the off-road environment;
Type of a surface material of the off-road environment;
Cross slope of the off-road environment;
Type of vegetation of the off-road environment;
Probability value for a presence of vulnerable traffic users; in particular, traffic users at risk of injury, for example, pedestrians;
Areal extent of the drivable off-road environment;
Extent of the drivable off-road environment perpendicular to the roadway boundary;
Extent of the drivable off-road environment parallel to the lane; and
Potential hazard for safe disembarkation in the off-road environment.

In this regard, the individual listed parameters of the plurality of parameters can each be combined with one another as desired, for example, in particular for determining an emergency drivability rating.

In this regard, the parameter traversability specifies a measure characterizing a traversability of a mobile platform to the off-road environment. For example, such a traversability to an off-road environment with the measure can characterize that an obstacle between the roadway and the off-road environment must be overcome or that a potential hazard, in particular for endangered traffic users or traffic users at risk of injury, may be present when changing from the roadway to the off-road environment. In particular, the traversability with a binary measure may indicate a possibility or impossibility to change to an off-road environment.

According to an aspect, it is proposed that by means of the drivability rating of the plurality of parameters of the respective off-road environment, the emergency drivability rating is determined.

In this regard, the respective parameters may be selected from the list presented above according to a realistic availability of the parameters and may be aggregated into a single aggregated parameter, such as in particular an emergency drivability rating, wherein for such aggregation individual parameters may be weighted differently, for example in particular according to an off-line weighted aggregation.

In other words, a respective drivability rating determines how strongly the respective parameter of the plurality of parameters for the description of the off-road environment is included in the determination of the emergency drivability rating.

According to an aspect, it is proposed that the emergency drivability rating is determined using the plurality of parameters of the respective off-road environment such that a drivability of the respective off-road environment is determined to be impossible if a measure of drivability to the off-road environment is below a predetermined threshold.

In this regard, a measure of drivability to the off-road environment is determined such that, for determining the emergency drivability rating using a combination of the plurality of parameters and the respective associated drivability ratings, if the measure of drivability is below a predetermined threshold drivability rating, the measure of emergency drivability rating indicates that a drivability of the respective off-road environment is impossible.

A method for determining an emergency trajectory for a mobile platform is proposed, comprising the following steps:

In one step, a location of the mobile platform is determined. In a further step, an associated lane segment of the navigation map described above to the location of the mobile platform is determined. In a further step, adjacent off-road environments assigned to adjacent lane segments of the determined lane segment are identified. In a further step, emergency drivability ratings are assigned to the adjacent off-road environments and the emergency trajectory comprising at least one adjacent off-road environment is determined, starting from the determined location of the mobile platform to a stopping position, taking into account the emergency drivability rating of the at least one adjacent off-road environment.

In this regard, a cost function may be used to determine the emergency trajectory, including either individual drivability rating parameters or a weighted combination in the calculation of the cost function.

In other words, by such pre-classification of the off-road environment with respect to the risk of driving there, a drivability rating can be explicitly provided as input for the calculation of emergency trajectories.

According to an aspect, it is proposed that the stopping position of the emergency trajectory is determined in an adjacent off-road environment and the emergency trajectory comprises another adjacent off-road environment different therefrom.

According to an aspect, it is proposed that a representation of the environment of the environment perception of the mobile platform is additionally considered for determining the emergency trajectory.

A method is proposed for selecting a route using the navigation map described above for an at least partially automated platform, wherein the route has a plurality of lane segments, and the route is selected such that the emergency drivability rating of the off-road environment of the plurality of lane segments along possible routes is determined and the route is optimized taking into account accumulated emergency drivability ratings of the lane segments along the route.

In other words, a route having a sufficient plurality of opportunities to stop the mobile platform in an off-road environment may be determined offline using the plurality of parameters and/or the emergency drivability rating or the respective drivability rating. Routes for which such opportunities to stop the mobile platform in an off-road environment are reduced can be avoided accordingly in a route planning process.

A method is proposed in which, based on a determined emergency trajectory described above, a control signal for controlling an at least partially automated vehicle is provided; and/or based on the determined emergency trajectory, a warning signal for warning a vehicle occupant is provided.

The term "based on" is to be understood broadly with respect to the feature that a control signal is provided based on an emergency trajectory. It is to be understood in such a way that the determined emergency trajectory is used for any determination or calculation of a control signal, whereby this does not exclude that other input variables are also used for this determination of the control signal. The same applies to the provision of the warning signal.

A device is proposed which is configured to perform one of the methods described above for determining an emergency trajectory and/or a method described above for selecting a route.

With such a device, the corresponding method can be easily integrated into different systems.

According to another aspect, there is disclosed a computer program comprising instructions that, when the computer program is executed by a computer, cause the computer program to perform one of the methods described above. Such a computer program enables the method described to be used in different systems.

A machine-readable storage medium is proposed on which the above-described computer program is stored.

An at least partially automated mobile platform may be an at least partially automated system that is mobile and/or a driver assistance system. An example may be an at least partially automated vehicle and/or a vehicle with a driver assistance system. That is, in this context, an at least partially automated system includes a mobile platform with respect to at least partially automated functionality, but a mobile platform also includes vehicles and other mobile machines including driver assistance systems.

Other examples of mobile platforms may include multi-sensor driver assistance systems, multi-sensor mobile robots such as robotic vacuum cleaners or lawn mowers, a multi-sensor surveillance system, a ship, an aircraft, a manufacturing machine, a personal assistant, or an access control system. Any of these systems may be a fully or partially autonomous system.

BRIEF DESCRIPTION OF THE DRAWINGS

FIG. 2 is a diagram illustrating a first exemplary process executed by the computer hardware arrangement and computer software (which can be provided on a machine-readable storage medium) for determining an emergency trajectory for a mobile platform, in accordance with the exemplary embodiment of the present disclosure.

EXAMPLES OF EMBODIMENTS

Figure 1:
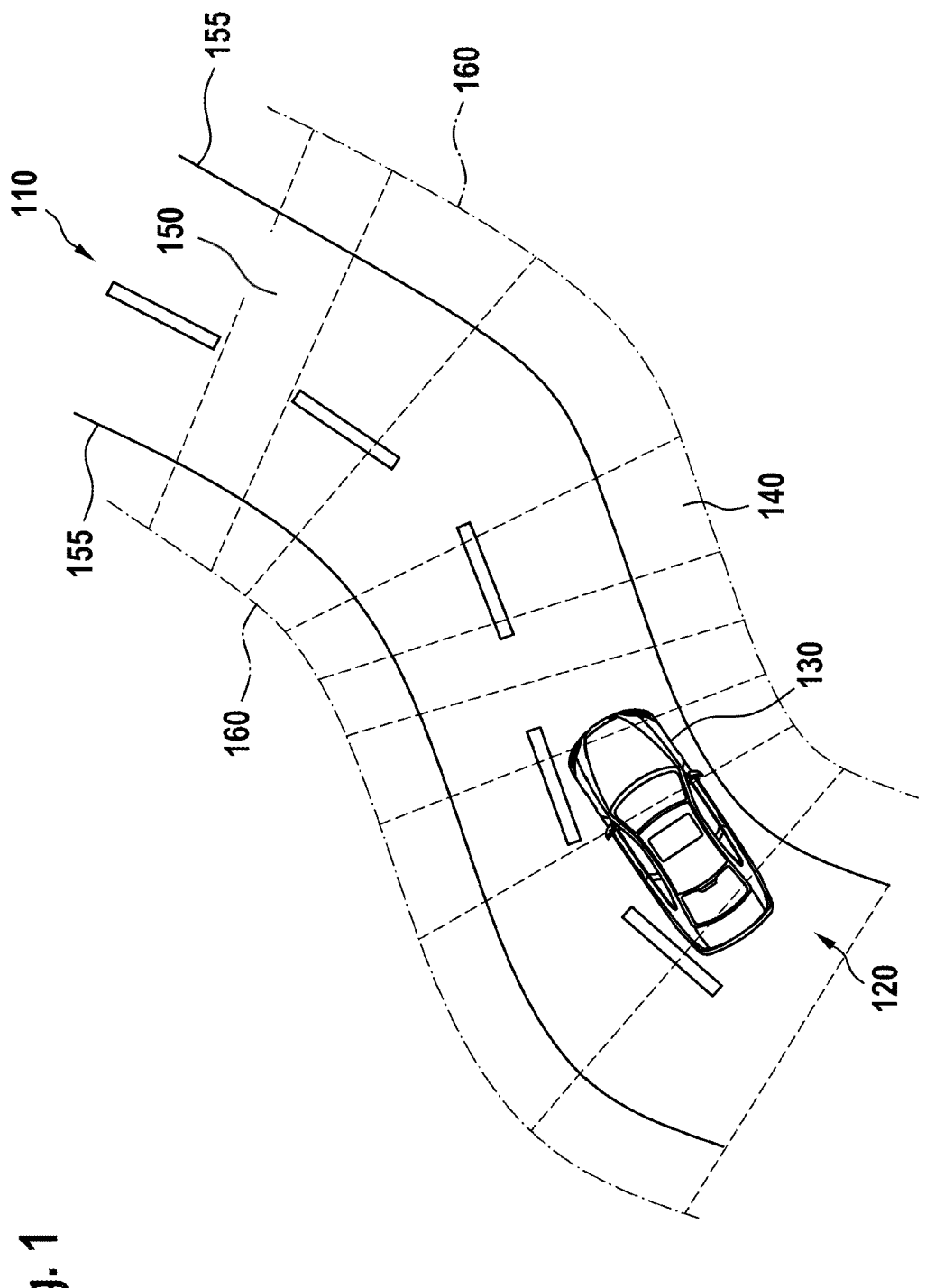
FIG. 1 is a section of a navigation map for an at least partially automated mobile platform with a plurality of lanes.

Examples of embodiments of the invention are illustrated with reference to FIG. 1 and explained in more detail below. It shows:

FIG. 1 sketches an exemplary section 110 of a navigation map for an at least partially automated mobile platform 130, which has a description of courses of a plurality of lanes 120, wherein the respective lane 120 of the plurality of lanes has a plurality of lane segments 150. Further, the portion 110 of the navigation map has off-road environment data of the plurality of lanes 120, wherein the off-road environment data is assigned to respective lane segments 150 of the respective lane, and wherein the off-road environment data has an emergency drivability rating for an off-road environment 140 of the respective lane segment 150.

In this regard, the line 155 outlines a boundary between the lane 120 and the off-road environment 140, and it is further outlined that, by way of example, the off-road environment 140 of the respective lane segment 150 is assigned to the respective lane segments according to an extension of the lane segments 150 indicated by a dashed line. In this regard, a line 160 delimits the respective off-road environment 140 classified with an emergency drivability rating to a remainder of the environment. The line 155 outlines a transition between the respective lane segment 150 and the associated off-road environment 140.

FIG. 2 shows a diagram illustrating an exemplary process executed by the computer hardware arrangement and computer software (which can be provided on a machine-readable storage medium) for determining an emergency trajectory for a mobile platform, in accordance with the exemplary embodiment of the present disclosure. As provided in FIG. 2, in procedure 210, a location of the mobile platform can be determined. In procedure 220, an associated lane segment of a navigation map with respect to the location of the mobile platform is determined. In procedure, 230, adjacent off-road environments associated with adjacent lane segments of the determined associated lane segment can be identified. In procedure 240, emergency drivability ratings can be determined, and the emergency drivability ratings are assigned to the adjacent off-road environments of the lane segments. Each of the emergency drivability ratings is determined as a composite rating based on a plurality of parameters of the respective one of the off-road environments, the plurality of parameters comprising at least surface condition, hazard potential, and probability of vulnerable road users. In procedure 250, the emergency trajectory can be determined that comprises at least one of the adjacent off-road environments of the lane segments from the determined location of the mobile platform to a stopping position, by taking into account an aggregate value of the accumulated emergency drivability ratings of the adjacent off-road environments. The emergency trajectory can be selected by optimizing the aggregate emergency drivability ratings along the emergency trajectory.

Figure 3:
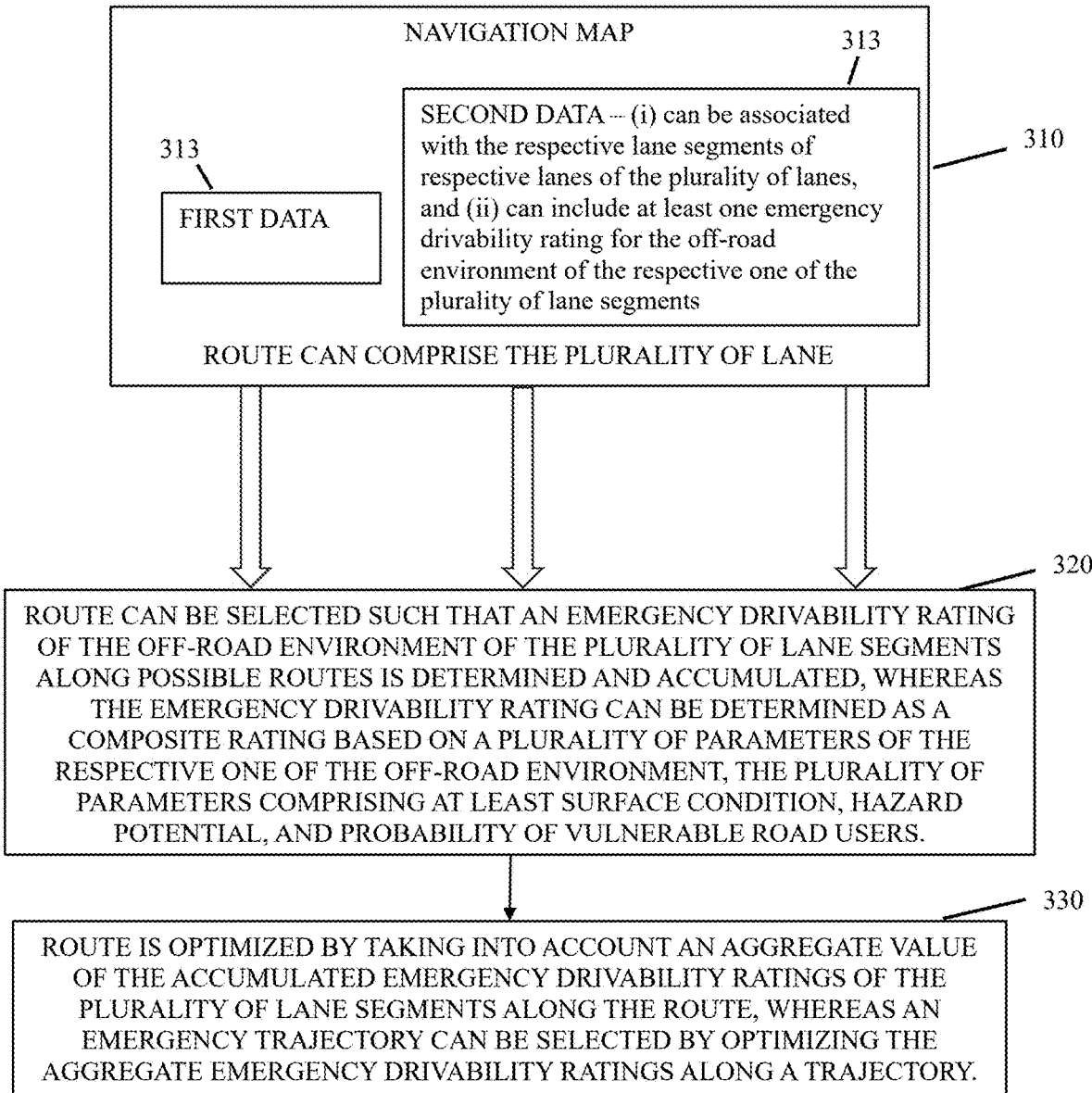
FIG. 3 is a diagram illustrating a first exemplary process executed by the computer hardware arrangement and computer software (which can be provided on a machine-readable storage medium) for selecting a route for at least partially automated platform, using a navigation map, in accordance with the exemplary embodiment of the present disclosure.

FIG. 3 shows a diagram illustrating an exemplary process executed by the computer hardware arrangement and computer software (which can be provided on a machine-readable storage medium) for selecting a route for at least partially automated platform, using a navigation map, in accordance with the exemplary embodiment of the present disclosure. The navigation map (illustrated in Block 310) can comprise comprises first data (block 313) for descriptions of courses of a plurality of lanes, and second data (block 317) for an off-road environment of the plurality of lanes. Each of the plurality of lanes can have a plurality of lane segments. The second data (block 317) (i) can be associated with the respective lane segments of respective lanes of the plurality of lanes, and (ii) can include at least one emergency drivability rating for the off-road environment of the respective one of the plurality of lane segments, whereas the route can comprise the plurality of lane segments.

In block 320, the route can be selected such that an emergency drivability rating of the off-road environment of the plurality of lane segments along possible routes is determined and accumulated, whereas the emergency drivability rating can be determined as a composite rating based on a plurality of parameters of the respective one of the off-road environment, the plurality of parameters comprising at least surface condition, hazard potential, and probability of vulnerable road users. In block 330, the route is optimized by taking into account an aggregate value of the accumulated emergency drivability ratings of the plurality of lane segments along the route, whereas an emergency trajectory can be selected by optimizing the aggregate emergency drivability ratings along a trajectory.

The invention claimed is:

1. A method for determining an emergency trajectory for a mobile platform, comprising:

determining a location of the mobile platform;

determining an associated lane segment of a navigation map with respect to the location of the mobile platform;

identifying adjacent off-road environments associated with adjacent lane segments of the determined associated lane segment;

determining emergency drivability ratings, and assigning the emergency drivability ratings to the adjacent off-road environments of the lane segments, wherein each of the emergency drivability ratings is determined as a composite rating based on a plurality of parameters of the respective one of the off-road environments, the plurality of parameters comprising at least surface condition, hazard potential, and probability of vulnerable road users; and determining the emergency trajectory that comprises at least one of the adjacent off-road environments of the lane segments from the determined location of the mobile platform to a stopping position, by taking into account an aggregate value of the accumulated emergency drivability ratings of the adjacent off-road environments, wherein the emergency trajectory is selected by optimizing the aggregate emergency drivability ratings along the emergency trajectory.

2. The method according to claim 1, wherein the stop position of the emergency trajectory is determined in an adjacent first environment of the off-road environments, and wherein the emergency trajectory comprises an adjacent first environment of the off-road environments that is different adjacent first environment.

3. The method according to claim 1, wherein a representation of the environment of the environment perception of the mobile platform is additionally taken into account for determining the emergency trajectory.

4. A method for selecting a route for at least partially automated platform, using a navigation map, wherein the navigation map comprises:

first data for descriptions of courses of a plurality of lanes, wherein each of the plurality of lanes has a plurality of lane segments; and second data for an off-road environment of the plurality of lanes, wherein the second data (i) is associated with the respective lane segments of respective lanes of the plurality of lanes, and (ii) includes at least one emergency drivability rating for the off-road environment of the respective one of the plurality of lane segments, wherein the route comprises the plurality of lane segments, and wherein the method comprises:

selecting the route such that an emergency drivability rating of the off-road environment of the plurality of lane segments along possible routes is determined and accumulated, wherein the emergency drivability rating is determined as a composite rating based on a plurality of parameters of the respective one of the off-road environment, the plurality of parameters comprising at least surface condition, hazard potential, and probability of vulnerable road users; and optimizing the route by taking into account an aggregate value of the accumulated emergency drivability ratings of the plurality of lane segments along the route, wherein an emergency trajectory is selected by optimizing the aggregate emergency drivability ratings along the emergency trajectory.

5. The method according to claim 1, further comprising providing at least one of:

a control signal for controlling an at least partially automated vehicle; or based on the determined emergency trajectory, a warning signal for warning a vehicle occupant.

6. An apparatus configured to determine an emergency trajectory for a mobile platform, comprising:

a computer hardware arrangement which is programmed to:

a) determine a location of the mobile platform, b) determine an associated lane segment of a navigation map with respect to the location of the mobile platform, c) identify adjacent off-road environments associated with adjacent lane segments of the determined associated lane segment, d) determine emergency drivability ratings, and assign the emergency drivability ratings to the adjacent off-road environments of the lane segments, wherein each of the emergency drivability ratings is determined as a composite rating based on a plurality of parameters of the respective one of the off-road environments, the plurality of parameters comprising at least surface condition, hazard potential, and probability of vulnerable road users; and e) determine the emergency trajectory that comprises at least one of the adjacent off-road environments of the lane segments from the determined location of the mobile platform to a stopping position, by taking into account an aggregate value of the accumulated emergency drivability ratings of the adjacent off-road environments, wherein the emergency trajectory is determined by optimizing the aggregate emergency drivability ratings along the emergency trajectory.

7. A computer program for determining an emergency trajectory for a mobile platform, the computer program comprising instructions, which, when the computer program is executed by a computer, configures the computer program to perform procedures comprising:

a) determining a location of the mobile platform;

b) determining an associated lane segment of a navigation map with respect to the location of the mobile platform;

c) identifying adjacent off-road environments associated with adjacent lane segments of the determined associated lane segment;

d) determining emergency drivability ratings, and assigning the emergency drivability ratings to the adjacent off-road environments of the lane segments, wherein each of the emergency drivability ratings is determined as a composite rating based on a plurality of parameters of the respective one of the off-road environments, the plurality of parameters comprising at least surface condition, hazard potential, and probability of vulnerable road users; and e) determining the emergency trajectory that comprises at least one of the adjacent off-road environments of the lane segments from the determined location of the mobile platform to a stopping position, by taking into account an aggregate value of the accumulated emergency drivability ratings of the adjacent off-road environments, wherein the emergency trajectory is determined by optimizing the aggregate emergency drivability ratings along the emergency trajectory.

8. A machine-readable storage medium which includes a computer program thereon for a mobile platform, wherein, when the computer program is executed by a computer, configures the computer program to perform procedures comprising:

a) determining a location of the mobile platform;

b) determining an associated lane segment of a navigation map with respect to the location of the mobile platform;

c) identifying adjacent off-road environments associated with adjacent lane segments of the determined associated lane segment;

d) determining emergency drivability ratings, and assigning the emergency drivability ratings to the adjacent off-road environments of the lane segments, wherein each of the emergency drivability ratings is determined as a composite rating based on a plurality of parameters of the respective one of the off-road environments, the plurality of parameters comprising at least surface condition, hazard potential, and probability of vulnerable road users; and e) determining an emergency trajectory that comprises at least one of the adjacent off-road environments of the lane segments from the determined location of the mobile platform to a stopping position, by taking into account an aggregate value of the accumulated emergency drivability ratings of the adjacent off-road environments, wherein the emergency trajectory is determined by optimizing the aggregate emergency drivability ratings along the emergency trajectory.

9. The method according to claim 1, further comprising:

selecting a route for an at least partially automated platform, using a navigation map, such that an emergency drivability rating of the off-road environment of the associated lane segments along possible routes is determined; and optimizing the route by taking into account accumulated emergency drivability ratings of the associated lane segments along the route.

10. The method according to claim 1, wherein the emergency drivability ratings are determined and stored for all of the off-road environments along an entirety of the emergency trajectory, and wherein an aggregate value of the accumulated emergency drivability ratings of all of the lane segments along the emergency trajectory is taken into account when selecting the emergency trajectory.

11. The method according to claim 4, wherein the emergency drivability ratings are determined and stored for all of the off-road environments along an entirety of the route, and wherein an aggregate value of the accumulated emergency drivability ratings of all of the lane segments along the route is taken into account when selecting the route.

12. The method according to claim 1, further comprising:

selecting a route such that the emergency drivability ratings of the off-road environment of the plurality of lane segments along possible routes are determined and accumulated; and optimizing the route by taking into account the accumulated emergency drivability ratings of the plurality of lane segments along the route.

* * * * *